3,287,405
PRODUCTION OF CARBOXYLIC ACIDS BY THE ALKALI FUSION OF 1,2-EPOXYCYCLOALKANES
Arnold J. Morway, Clark, Jeffrey H. Bartlett, New Providence, and Samuel B. Lippincott, Springfield, N.J., assignors to Esso Research and Engineering Company, a corporation of Delaware
No Drawing. Filed Oct. 31, 1961, Ser. No. 148,858
4 Claims. (Cl. 260—537)

This invention relates to alkali fusion of oxygen-containing alicyclic compounds, products obtained by said fusion, the process of carrying out said fusion and manufacturing said products, and oil compositions containing said products. The invention also relates to lubricating oil compositions containing metal salt of acid derived from the alkali fusion of oxygen-containing alicyclic compounds.

Valuable materials can be obtained by fusing alicyclic epoxides at high temperatures with caustic alkali, using about 1 to 2, or more, moles of alkali per mole of oxygen present in the alicyclic material. An alkali salt results from the fusion reaction which can be utilized directly in lubricating oil as a thickener to form greases. Fluid lubricants and other useful hydrocarbon compositions can also be prepared from said alkali salt product. In addition, the alkali salt of the fusion reaction can be sprung with a strong mineral acid to form aliphatic carboxylic acid. This carboxylic acid, in turn, can be converted into other salts, esters, amides, alkanol amides, etc., for use in lubricant manufacture, agricultural chemicals, paints, adhesives, detergents, etc.

The oxygen-containing alicyclic compounds of the present invention are epoxy cycloalkanes represented by the general formula: R=O, where each of the two bonds attached to the oxygen atom is attached to adjacent carbon atoms and R is a saturated hydrocarbon ring containing 5 to 20 carbon atoms and preferably containing 8 to 16 carbon atoms. In addition, the ring can be substituted with other hydrocarbon groups, which can be either saturated or unsaturated, such as alkyl or alkylene groups. Furthermore, aryl, or alkaryl groups, or various combinations of these groups, may also be attached to the hydrocarbon ring possessing the oxygen.

The epoxy cycloalkanes and methods for their preparation are known in the art. One advantage of these epoxy cycloalkanes is that a number of them can be prepared from low molecular weight olefins which are readily available from oil refining operations. For example, one manner in which epoxy cycloalkanes can be obtained from olefins is represented by the following reactions using butadiene as a feed stock:

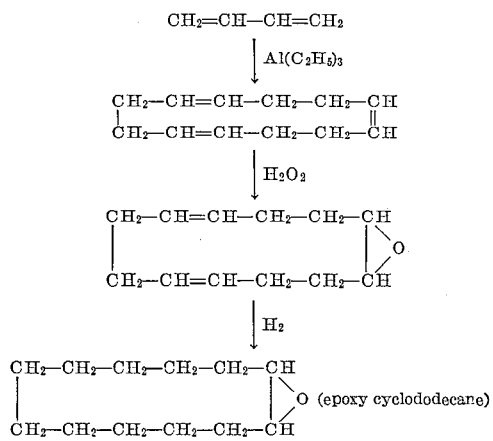
(epoxy cyclododecane)

While the above equations used butadiene, other olefin feeds such as isoprene; piperylene; 2,3-dimethyl butadiene; and other open chain conjugated diolefins can be carried through similar reactions.

Specific examples of epoxy cycloalkanes operable in the invention include 1,2-epoxycyclooctane; 1,2-epoxycyclododecane; 1,2-epoxy - 2 - methylcyclododecane; 1,2-epoxy-3,7,11-trimethylcyclododecane; and 1,2-epoxycyclohexadecane.

During the fusion process, the alkali appears to primarily react with the epoxy cycloalkane to break the molecule at the oxygen atom to form acid salt as typified by the following equations using epoxy cyclododecane as an example.

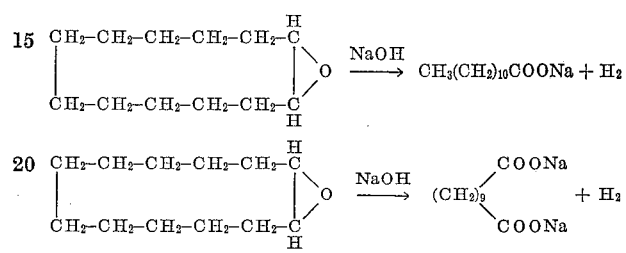

The above equations are believed to represent the primary reactions, although it is not understood what happens to the extra carbon atom of the second equation. Also, several other acids are also formed.

The alkali fusion can be carried out as follows: Alkali metal oxide, or alkali metal hydroxide such as sodium hydroxide or potassium hydroxide, preferably in flake or pellet form, is dispersed in an inert mineral oil menstrum. The mixture can then be heated to about 450° to 700° F., e.g., 525° to 625° F., and the epoxy cycloalkane slowly added, either in increments or continuously, over a period of about ½ to 15 hours, e.g. 1 to 5 hours, while vigorously stirring and maintaining a reaction temperature of about 450° to 700° F., e.g. 525° to 625° F. Or, all of the components can be charged to the reactor at the same time and then heat is applied, etc. The resulting product is alkali metal salt of aliphatic monocarboxylic acid and/or salt of linear dicarboxylic acid, in oil.

The fusion can be carried out using only the alkali and epoxide reactants. However, the fusion is preferably carried out in an inert oil, e.g. mineral oil, in order to obtain better heat transfer. Also, the oil serves as a medium for better dispersion of the alkali and as a solvent for the alicyclic epoxide reactant, thus insuring better contact of the reactants during the fusion.

An acid can be prepared from the salt-oil product as follows:

The reaction mixture above is cooled and water is added. The resulting salt-oil-water can then be extracted with a light hydrocarbon solvent, such as heptane or the like, in order to remove the oil and unreacted alicyclic material to thereby leave an aqueous phase. The remaining aqueous phase is acidified with a mineral acid, e.g. hydrochloric acid, to form monocarboxylic and/or dicarboxylic acid. The carboxylic acid can then be removed from the aqueous phase by extraction with a light solvent, e.g. heptane or diethylether, and finally crude carboxylic acid is obtained by evaporation of the solvent. While the crude acid may be directly utilized without further purification, it can be purified by vacuum distillation or other known procedures. This acid can then be used for various purposes as previously indicated.

Excellent lubricating greases can be prepared by carrying out the fusion in lubricating oil in the presence of fatty acids to form mixed-salt systems comprising alkali metal salts of fatty acid and alkali metal salts of the aliphatic carboxylic acid formed from the alkali fusion. In this manner, it is possible to eliminate the steps of forming and separating the acid or salt derived from the alicyclic epoxide. This in situ grease-making process is preferably carried out by dispersing the fatty acid and the alicyclic compound in the lubricating oil, adding the alkali, preferably in the form of a 40 to 50 percent aqueous solution, and heating to about 250° to 300° F., until the fatty acids are converted to salts or soaps, and all the water of reaction is volatilized. The alkali fusion is then carried out by further heating to about 450° to 700° F., e.g. 500° to 600° F., until hydrogen evolution substantially ceases, e.g. about ¼ to 5 hours. The lubricant may then be cooled and finished by conventional means.

These mixed salt systems are best made to contain 1 to 10, preferably 2 to 4 parts by weight of low molecular weight fatty acid per part by weight of alicyclic compound used to make the fusion acid. These systems can also contain 2 to 20, preferably 5 to 10, parts by weight of intermediate or high molecular weight fatty acid per part by weight of the alicyclic compound used to form the fusion acid. Greases can be thus prepared containing 5.0 to 40.0 weight percent, e.g. 10 to 35 weight percent of the mixed salt. These greases in turn can be diluted with additional oil to form fluid or semi-fluid compositions containing about 0.1 to 5.0% of the mixed salt. The preceding weight percents are based on the total weight of the composition.

Suitable low molecular weight acids for forming mixed salt compositions include fatty acids having 1 to 6 carbon atoms such as formic, acetic, propionic, and similar acids including their hydroxy derivatives such as lactic acid, etc. Acetic acid or its anhydride is preferred. Mixtures of these low molecular weight acids may be employed if desired.

Intermediate molecular weight fatty acids which may be used include those aliphatic, saturated or unsaturated, unsubstituted, monocarboxylic acids containing 5 to 12 carbon atoms per molecule, e.g. capric, caprylic, nonanoic, lauric acid, etc.

The high molecular weight fatty acids or aliphatic monocarboxylic acids useful for forming the mixed salt of the invention include naturally-occurring or synthetic, substituted or unsubstituted, saturated or unsaturated, mixed or unmixed fatty acids having about 13 to 30, e.g. 16 to 24 carbon atoms per molecule. Examples of such acids include myristic, palmitic, stearic, hydroxy stearic, such as 12-hydroxy stearic, di-hydroxy stearic, polyhydroxy stearic and other saturated hydroxy fatty acids, arachidic, oleic, ricinoleic, hydrogenated fish oil, tallow acids, etc.

The metal component of the mixed salt thickeners is potassium or sodium, if the fatty acids are also converted into salts during the fusion reaction. However, if the fatty acid salts are separately added to the oil after the fusion salt is formed, then other metals can be used to form the fatty acid salts. Or, the mixed salts can be prepared from fatty acid and the carboxylic acid derived from fusing the alicyclic epoxide. These other metals include alkaline earth metals, such as calcium, strontium, barium and magnesium.

The lubricating oil used in the compositions of the invention may be either a mineral lubricating oil or a synthetic lubricating oil. Synthetic lubricating oils which may be used include esters of dibasic acids (e.g. di-2-ethylhexyl sebacate), esters of glycols (e.g. $C_{13}$ Oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfite esters, mercaptals, formals, polyglycol type synthetic oils, etc., or mixtures of any of the above in any proportions. However, the fusion of the alicyclic compound is preferably carried out in a mineral oil, since synthetic oils will usually tend to decompose during the fusion. The fusion salt or fusion acid, once formed, can be used in lubricants containing the other synthetic oils noted above.

Various other additives may also be added to the lubricating composition (e.g. 0.1 to 10.0 weight percent) of detergents such as calcium petroleum sulfonate; oxidation inhibitors such as phenyl-alpha-naphthylamine; corrosion inhibitors, such as sorbitan monooleate; dyes; other grease thickeners, and the like.

If the fusion acid is used in maikng a mixed salt lubricant, then the lubricant can be prepared by coneutralizing the fatty acid and the fusion acid in a lubricating oil menstrum by the addition of a sufficient amount of alkali metal base or alkaline earth metal base. Heating can be applied, e.g. 250° to 550° F., if a dehydrated product is desired. If a cold-set product is desired, then dehydration is not necessary and any water of reaction is left in the composition. The lubricant can then be homogenized as by passing it through a Gaulin homogenizer or a Charlotte mill, followed by subsequent cooling to room temperature.

The invention will be further understood by the following examples, wherein all parts are by weight and which include preferred embodiments of the invention.

EXAMPLE I

An epoxy cyclododecane was converted into acid as follows:

A one gallon nickel reactor equipped with a stirrer, condenser, thermometer and feed line was charged with 555 gms. NaOH pellets, 500 gms. of KOH pellets and 500 gms. of Primol D, which is a white oil. This mixture was then heated to about 330° C. and maintained at this temperature for 3 hours while 776 gms. of epoxy cyclododecane were slowly added over the 3 hour period. During the total reaction time 10.2 standard cubic feet of gas were evolved. At the end of this time, the mixture was allowed to cool to 280° C. where it was removed from the reactor and poured into an aqueous alcohol mixture consisting of 6 liters of water and 3 liters of isopropyl alcohol. The total mixture was then extracted 3 times, with about two liters each time of petroleum ether, which is hydrocarbon mixture boiling in the range of 40° to 60° C. The mixture was extracted once with about two liters of toluene. These extractions removed the Primol D and other hydrocarbon soluble materials. Next, the remaining aqueous layer was mived with concentrated hydrochloric acid to convert the salt into the free crude carboxylic acid. The crude carboxylic acid was then removed by extraction with peroleum ether. This extract was then heated on a steam bath to evaporate the petroleum ether and approximately 485 gms. of the crude acid was obtained.

In order to obtain the acid in a more pure form for analysis, a portion of the above crude acid was converted into methyl ester by esterification of the crude acid with methanol, using toluene sulfonic acid as a catalyst. Specifically, 3,000 ml. of methanol was added to 439 gms. of the crude acid along with 15 gms. of toluene sulfonic acid as a catalyst. This mixture was then heated under partial reflux for about 5 hours during which time about ½ of the methanol distilled along with some water of esterification. One liter of fresh methanol was added and the distillation repeated. This was repeated for a total of five charges of fresh methanol, sufficient to essentially complete the esterification. The residue was diluted with 1 liter of hexane and was washed once with 4 liters of water and then with 1 liter of an aqueous solution containing 2 wt. percent of sodium hydroxide to neutralize the toluene sulfonic acid catalyst. It was then washed until neutral to litmus. The hexane solution was then distilled in a short path still under slightly reduced pressure to remove the hexane. Then the distillation was continued under high vacuum to obtain the cuts shown in the following table:

*Distillation of methyl ester of crude fusion acid*

| Cut | Vapor Temp., °C. | Pressure, mm. Hg. | Amount of cut in grams | Saponification No. of cut, mg. KOH/gm. | Bromine No. Cgs. Br$_2$/gm. |
|---|---|---|---|---|---|
| 1 | 90 | 0.2 | 150 | 288.5 | 35.7 |
| 2 | 120 | 0.2 | 45 | 348.5 | 21.9 |
| 3 | 190 | 1.0 | 79 | 229.0 | 24.5 |
| Bottoms | | | 72 | | |

The methyl ester of the crude acid began boiling at 60° C. under 0.2 mm. Hg pressure. That portion boiling between 60° C. and 90° C. constituted Cut 1. Cut 2 was the portion boiling between 90° and 120° C. while Cut 3 boiled between 120° and 190° C.

Cut No. 1 per se was subjected to mass spectrographic analysis. A portion of Cut 1 was hydrogenated at room temperature using platinum oxide as a catalyst, and the hydrogenated product was also subjected to mass spectrographic analysis. The results of these analyses show that Cut 1 consisted of esters of the following acids:

|   | Weight percent acid |
|---|---|
| Lauric acid ($C_{12}$) | 26.8 |
| Normal $C_{12}$ unsaturated monocarboxylic acid | 20.1 |
| Normal undecyclic acid ($C_{11}$) | 5.3 |
| 1,9-nonamethylene dioic acid ($C_{11}$) | 8.6 |
| Capric acid ($C_{10}$) | 38.4 |
| Sebacic acid ($C_{10}$) | 0.8 |

Cut No. 2 was not carried to its ultimate analysis but was shown to be substantially only the esters of n-$C_{12}$ monocarboxylic acids and the 1,9 nonamethylene dioic acids. The saponfication number of Cut No. 2 indicates that these two acids are present in the approximate ratio of 56 wt. percent n-$C_{12}$ monocarboxylic acid to 44 wt. percent of the 1,9 nonamethylene dioic acid.

Cut No. 3 and the bottoms were not subjected to mass spectrographic analysis.

The above data indicate the type acids obtained by the alkali fusion. It is interesting to note that acids having odd numbers of carbon atoms can be obtained, as well as both mono and dicarboxylic acid, and saturated and unsaturated acids.

A mixed salt grease was prepared from the unesterified portion of the crude acid as follows:

10.4 parts of hydrated lime, 70.6 parts of mineral lubricating oil having a viscosity of 55 SUS at 210° F. and 6 parts of the crude acid were mixed in a kettle to a smooth slurry. 12 parts of glacial acetic acid was then slowly added while mixing and the mass was heated to 420° F. Heating was then discontinued and the reaction mass cooled rapidly to 200° F. where 1 part of phenyl-alpha-naphthylamine was added. The composition was then further cooled to 100° F. where it was homogenized by passing through a Morehouse mill having 0.003" clearance.

To illustrate a mixed salt grease prepared directly from epoxy cyclododecane, Example II was carried out.

EXAMPLE II

A grease composition was prepared as follows: 10 parts of Hydrofol Acids 51 (hydrogenated fish oil acids corresponding to stearic acid in degree of unsaturation and average chain length), 10 parts of epoxycyclododecane, and 68.5 parts of mineral lubricating oil having a viscosity of 55 SUS at 210° F. were added to a fire-heated kettle. The kettle contents were then stirred while heating to 150° F. Then 6.5 parts of sodium hydroxide (100%) was added in the form of an aqueous solution consisting of 40 wt. percent of sodium hydroxide and 60 wt. percent water. Heating was then carried out in accordance with the following schedule.

| Time: | Temperature, °F. |
|---|---|
| 9:50 a.m. | 160 |
| 10:00 a.m. | 280 |
| 20 a.m. | 450 |
| 30 a.m. | 540 |
| 11:00 a.m. | 680 |
| 11:15 a.m. | 590 |
| 11:30 a.m. | 450 |
| 11:55 a.m. | 265 |
| 1:00 p.m. | 125 |

1 part of phenyl-α-napthylamine as an antioxidant was added at a temperature of 200° F. during the cooling cycle. The product was then finished by homogenizing by passing it through a Morehouse mill having about 0.003" clearance.

The grease compositions of Examples I and II prepared above and their physical properties are summarized in Table I which follows:

TABLE I

| Grease Composition (Wt. Percent) | Examples | |
|---|---|---|
|   | I | II |
| Epoxy cyclododecane | | 10.0 |
| Fused extracted acids from epoxycyclododecane | 6.0 | |
| Hydrofol Acids 51 | | 10.0 |
| Glacial Acetic Acid | 12.0 | 4.0 |
| Sodium Hydroxide | | 6.5 |
| Hydrated lime | 10.4 | |
| Phenyl-α-naphthylamine | 1.0 | 1.0 |
| Mineral Lubricating Oil, 55 SUS at 210° F. | 70.6 | 68.5 |
| Properties: Appearance | (4) | (4) |
| Dropping Point, °F | 500+ | 475 |
| ASTM Penetration—77° F., mm./10: | | |
| Unworked | 286 | 300 |
| Worked 60 Strokes | 300 | 310 |
| Worked 10,000 Strokes | 305 | 315 |
| Water solubility [1] | (5) | (6) |
| Wheel Bearing Test [2] | Pass | Pass |
| Lubrication Life [3] in Hours at 250° F.—10,000 r.p.m. | 2,000+ | 2,000+ |

[1] ASTM D1,264-53T.
[2] Accelerated ASTM D1,263-53T.
[3] ABEC-NLGI Spindle Test.
[4] Homogeneous grease.
[5] Insoluble.
[6] Soluble.

In sum, the present invention relates to alkali fusion of epoxy cycloalkane to form salts, which can be converted into acids, or which can be used per se in lubricant making. One advantage of the present invention is that carboxylic acids can be prepared from oil refinery olefins as previously indicated. Another advantage is that acids can be prepared which are relatively rare and expensive. Thus, fusion of epoxy cyclododecane produced 1,9-nonamethylene dioic acid which currently is a high price chemical. Yet, as shown in Example I, and considering Cuts 1 and 2, at least 32 grams of the 439 grams of crude acid esterified was the relatively rare 1,9-nonamethylene dioic acid. The above and other advantages are achieved by the present invention.

What is claimed is:

1. A process for preparing alkali metal salt of aliphatic carboxylic acid which comprises dispersing sodium hydroxide pellets and potassium hydroxide pellets in a white oil, heating the resulting dispersion to a temperature of about 525° to 625° F., slowly adding an 1,2-epoxycycloalkane containing 5 to 20 carbon atoms to said dispersion over a period of about ½ to 15 hours while vigorously stirring and maintaining a reaction temperature of about 525° F. to 625° F., and cooling to thereby form a product containing alkali metal salt of carboxylic acid.

2. A process which comprises: fusing, in mineral oil, caustic alkali with 1,2-epoxycycloalkane containing 8 to 16 carbon atoms in the hydrocarbon ring, at about 450° to 700° F., to thereby form alkali metal salt of aliphatic carboxylic acid, wherein said alkali metal and the metal component of said caustic alkali is selected from the group consisting of sodium and potassium.

3. A process according to claim 2, wherein said alkali metal salt is further reacted with inorganic mineral acid to obtain carboxylic acid, and then recovering said carboxylic acid.

4. A process according to claim 3, wherein said 1,2-epoxycycloalkane is 1,2-epoxycyclododecane, and wherein said aliphatic carboxylic acid is 1,9-nonamethylene dioic acid.

References Cited by the Examiner

UNITED STATES PATENTS

| | | | |
|---|---|---|---|
| 1,961,623 | 6/1934 | Pelton | 260—531 |
| 2,614,122 | 10/1952 | Mikeska | 260—537 |
| 2,625,558 | 1/1953 | Logan | 260—537 |
| 2,696,500 | 12/1954 | Stein | 260—537 |
| 2,801,972 | 8/1957 | Bartlett et al. | 252—41 |
| 2,801,974 | 8/1957 | Morway et al. | 252—41 |
| 2,802,846 | 8/1957 | Mertzweiller | 260—413 |
| 2,926,182 | 2/1960 | Sutton | 260—413 |
| 3,070,626 | 12/1962 | Convery | 260—537 |
| 3,121,728 | 2/1964 | Bartlett et al. | 260—531 |

OTHER REFERENCES

"The Merck Index of Chemicals and Drugs," sixth edition, published by Merck and Co., Inc., 1952, Rahway, New Jersey, pages 870 and 889. (Copy in Division 64.)

LORRAINE A. WEINBERGER, *Primary Examiner.*

LEON ZITVER, JOSEPH R. LIBERMAN, *Examiners.*

I. VAUGHN, I. R. PELLMAN, *Assistant Examiners.*